United States Patent
Miyamoto et al.

(10) Patent No.: US 7,452,554 B2
(45) Date of Patent: Nov. 18, 2008

(54) PLATINUM NANOCOLLOID SOLUTION, PROCESS FOR PRODUCING THE SAME AND DRINK CONTAINING PLATINUM NANOCOLLOID

(75) Inventors: Yusei Miyamoto, Tokyo (JP); Masashi Kajita, Tokushima-ken (JP); Naoki Toshima, Toyko (JP)

(73) Assignee: APT Co, Ltd., Tokyo (JP)

( * ) Notice: Subject to any disclaimer, the term of this patent is extended or adjusted under 35 U.S.C. 154(b) by 335 days.

(21) Appl. No.: 10/539,585

(22) PCT Filed: Jun. 9, 2004

(86) PCT No.: PCT/JP2004/008042

§ 371 (c)(1),
(2), (4) Date: Jun. 17, 2005

(87) PCT Pub. No.: WO2005/023467

PCT Pub. Date: Mar. 17, 2005

(65) Prior Publication Data

US 2006/0024382 A1    Feb. 2, 2006

(30) Foreign Application Priority Data

Sep. 3, 2003 (JP) ............................. 2003-311377
Mar. 9, 2004 (JP) ............................. 2004-066385

(51) Int. Cl.
*A61K 33/24* (2006.01)
*A61K 9/10* (2006.01)
*A61K 9/14* (2006.01)
*A23L 2/52* (2006.01)

(52) U.S. Cl. .................. 424/649; 424/489; 514/970
(58) Field of Classification Search ............ 424/649
See application file for complete search history.

(56) References Cited

U.S. PATENT DOCUMENTS 3,878,664 A * 4/1975 Zinke .......................... 53/432
6,090,858 A * 7/2000 El-Sayed ..................... 516/97

FOREIGN PATENT DOCUMENTS

| JP | 10-068008 | 3/1998 |
| JP | 11-346715 A | 12/1999 |
| JP | 2001-079382 | 3/2001 |
| JP | 2002-60805 A | 2/2002 |
| JP | 2002-102679 A | 4/2002 |
| JP | 2002-180110 A | 6/2002 |
| JP | 2002-212102 | 7/2002 |
| JP | 2002-285207 A | 10/2002 |

OTHER PUBLICATIONS

Translation (Machine) of JP 2002-212102 (2002).*
Patent Abstracts of Japan, abstracting JP 11-346715 (1999).*
HCAPLUS abstract 2001:47787 (2001).*
Devi, G.S. et al., "Room temperature synthesis of colloidal platinum nanoparticles," Bull. Mater. Sci., vol. 23(6), pp. 467-470 (Dec. 2000).*

* cited by examiner

*Primary Examiner*—John Pak
(74) *Attorney, Agent, or Firm*—Sughrue Mion, PLLC (57) ABSTRACT

A nanocolloidal platinum dispersion comprising nanocolloidal platinum and a polyacrylic acid salt, the nanocolloidal platinum having an average particle size of 1-5 nm, 90% or more of the nanocolloidal platinum having a particle size in a range of 0.1-10 nm, its production method, and a drink containing such a nanocolloidal platinum dispersion.

10 Claims, 3 Drawing Sheets

PLATINUM NANOCOLLOID SOLUTION, PROCESS FOR PRODUCING THE SAME AND DRINK CONTAINING PLATINUM NANOCOLLOID

This application is a 371 of PCT/JP04/08042, filed on Jun. 9, 2004.

FIELD OF THE INVENTION

The present invention relates to a nanocolloidal platinum dispersion containing nanocolloidal platinum and a colloid-protecting agent, which has excellent ability to remove active oxygen species, and its production method, and a drink containing such nanocolloidal platinum.

BACKGROUND OF THE INVENTION

A lot of high reactivity, reactive oxygen species such as superoxide anion radicals ($O_2^-$.), hydrogen peroxide ($H_2O_2$), hydroxyl radicals (.OH), singlet oxygen ($^1O_2$) [excited molecules], etc. are generated in a human body, particularly in mitochondrias, microsomes, leukocytes, etc. It is reported that such reactive oxygen species are involved in biological defense including ecological defense, biochemical reactions, etc. In normal cells, these reactive oxygen species are formed in about 1 mol % of a redox reaction, a main reaction, and the generated reactive oxygen species are metabolized by decomposing enzymes, etc.

Though 95% or more by mass of oxygen taken into a human body by aspiration is turned to water through a usual metabolism process, the remaining few percentages of oxygen is turned to reactive oxygen species in electron transfer systems such as mitochondrias and microsomes. In most cases, the generated reactive oxygen species are removed by antioxidant enzymes such as superoxide dismutase (SOD), glutathione peroxidase, etc.

However, all reactive oxygen species are not necessarily removed from the human body even with these antioxidant enzymes, so that part of the reactive oxygen species oxidize proteins, lipids, nucleic acids, etc. Though part of oxidized substances are repaired by a biological defense mechanism, some of them remain damaged. It is considered that the accumulation of substances damaged by oxidation in a human body causes diseases and aging.

The amounts of expressed antioxidant enzymes such as SOD, etc. decrease with age. If decrease in the ability to remove reactive oxygen species by aging and excess production of reactive oxygen species by disease overwhelm the metabolism, the reactive oxygen species are accumulated, resulting in the nonspecific oxidation of cell components such as lipids, etc. and thus the death of cells. The accumulation of reactive oxygen species causes aging, and many diseases such as habit-related diseases, Alzheimer's disease, etc.

When a human body takes a large amount of oxygen by vigorous sports or labor, he suffers from the generation of excess reactive oxygen species, and loses moisture and minerals by fatigue and perspiration, resulting in decrease in the activity of antioxidant enzymes and thus the accumulation of large amounts of active oxygen species in the body. Having sports drinks, etc. containing minerals is effective to recover from fatigue by making up the lost moisture and minerals. However, because conventional sports drinks do not have ability to remove reactive oxygen species, they are substantially ineffective to remove reactive oxygen species from the body. Accordingly, demand is mounting for drinks capable of efficiently removing reactive oxygen species from the body, which can be easily taken while playing sports.

It is known that vitamins such as vitamin C, vitamin E, etc. have ability to remove reactive oxygen species. Drinks containing these vitamins are commercially available and easy to have. However, limited amounts of vitamins are absorbed in the digestive organs, and excess vitamins are excreted through the kidney. Even if one has large amounts of vitamin-containing drinks, vitamins cannot be kept at high concentrations in the body. Also, the vitamins themselves are oxidized by the reactive oxygen species, losing the ability to remove reactive oxygen species. The oxidized vitamins function as oxidants to oxidize proteins, lipids, nucleic acids, etc. in the body. This indicates that too high concentrations of vitamins are rather harmful to the body. It is thus said that vitamins are double-edged swords for humans. Accordingly, having a large amount of a vitamin-containing drink once to efficiently remove reactive oxygen species is likely to be harmful to the health.

JP 2002-212102 A discloses electrochemically and biologically active micro-particles providing rich anions to the body, and supplying negative charges to receptors in the body tissue while passing through the digestive organs, to keep the biological activity of the receptors. The electrochemically and biologically active micro-particles specifically described therein are colloidal platinum particles treated by a surfactant, etc. It is also described that the electrochemically and biologically active micro-particles can be added to soft drinks, etc. It is further described that the metal salt-reducing method, etc. described in JP 2001-79382 A can be used in the production of the electrochemically and biologically active micro-particles.

The metal salt-reducing method of JP 2001-79382 A comprises adding a solution of metal ions of platinum, etc. and a pH-adjusting agent (sodium hydrogen carbonate, etc.) to a treatment solution comprising a reducing agent (ethanol), a nonionic surfactant (colloid-protecting agent) and water, and heating the resultant mixed solution while stirring to reduce the metal ions to form metal colloid. According to this method, a high-concentration colloidal metal dispersion with little agglomeration of metal colloid particles can be produced by adjusting a treatment solution temperature, the proportions of the surfactant and the reducing agent to the metal ion solution, etc.

JP 2001-79382 A describes only Polysorbate 80 as a nonionic surfactant. However, it has been found that a colloidal platinum dispersion containing Polysorbate 80 as a colloid-protecting agent has insufficient ability to remove reactive oxygen species. In addition, Polysorbate 80 per se is not permitted as a food additive that can be added to drinks in Japan. Accordingly, the colloidal platinum dispersion containing Polysorbate 80 as a colloid-protecting agent is not only unsatisfactory for drinks, but also suffers from safety problems.

JP 10-68008 A discloses a method for producing a colloidal platinum dispersion by adding ethanol as a reducing agent to a chloroplatinic acid solution containing Polysorbate 80, stirring the resultant mixture while heating, and subjecting the mixture to a dialysis treatment using an ultrafilter to remove Polysorbate 80. JP 10-68008 A describes that Polysorbate 80 does not remain in the colloidal platinum dispersion obtained by this method, and that the colloidal platinum particles per se are not precipitated because of negative charge.

However, it is considered that because Polysorbate 80, a kind of the colloid-protecting agents, is combined to the colloidal platinum particles, for instance, by association, adsorption, coordination, etc., part of Polysorbate 80 remains in the colloidal platinum dispersion even after the dialysis treatment using an ultrafilter. Also, the inventors' research has revealed that the colloidal platinum particles per se are not charged, failing to keep a colloidal state without a colloid-protecting agent.

Further research has revealed that colloidal platinum particles in the colloidal platinum dispersion prepared by the method of JP 2001-79382 A have a wide particle size distribution, which largely differs from lot to lot. However, because large colloidal platinum particles are not absorbed in a human body through digestive organs, they fail to remove active oxygen species in the body. Further, because a higher percentage of large colloidal platinum particles results in decrease in the total surface area of the colloidal platinum particles at the same platinum concentration, the ability of the colloidal platinum dispersion to remove reactive oxygen species is inevitably lowered. Also, if the particle size distribution largely differed from lot to lot, the percentage of large colloidal platinum particles having substantially no contribution to the removal of reactive oxygen species would be different even at the same platinum concentration, resulting in a varying percentage of effective colloidal platinum particles and thus extreme difference in the ability to remove active oxygen species. Accordingly, the method of JP 2001-79382 A fails to produce a colloidal platinum dispersion having stably high ability to remove reactive oxygen species.

It is known to use polyvinylpyrrolidone, dodecanthiol, sodium polyacrylate, methyl cellulose, etc. as protecting agents of metal colloids. Among these protecting agents, sodium polyacrylate is a permitted food additive causing no safety problems. It has been found, however, that when ethanol is removed from the nanocolloidal platinum dispersion obtained by the method of JP 2001-79382 A using sodium polyacrylate as a protecting agent, the dispersion becomes sticky, failing to form a uniform colloidal platinum dispersion by adding water.

OBJECTS OF THE INVENTION

Accordingly, an object of the present invention is to provide a highly safe nanocolloidal platinum dispersion capable of removing reactive oxygen species efficiently and stably in a human body.

Another object of the present invention is to provide a method for efficiently producing such a nanocolloidal platinum dispersion.

A further object of the present invention is to provide a drink containing such nanocolloidal platinum.

DISCLOSURE OF THE INVENTION

As a result of intense research in view of the above objects, the inventors have found that (a) a nanocolloidal platinum dispersion containing nanocolloidal platinum particles having a narrow particle size distribution and a polyacrylic acid salt as a protecting agent, etc. has excellent ability to remove reactive oxygen species; that (b) the nanocolloidal platinum dispersion can be produced by refluxing a solution comprising a platinum salt, a polyacrylic acid salt, an alcohol and water, evaporating the alcohol and water to such an extent that part of them remain, adding alcohol, and evaporating most of the alcohol and water from the resultant colloidal dispersion; and that (c) the addition of such nanocolloidal platinum dispersion provides various drinks with excellent ability to remove reactive oxygen species while keeping good dispersion of nanocolloidal platinum. The present invention has been completed based on these findings.

Thus, the nanocolloidal platinum dispersion of the present invention comprises nanocolloidal platinum and a polyacrylic acid salt, the nanocolloidal platinum having an average particle size of 1-5 nm, 90% or more of the nanocolloidal platinum having a particle size in a range of 0.1-10 nm.

The concentration $IC_{50}$ of nanocolloidal platinum necessary for reducing the concentration of reactive oxygen species such as superoxide anion radicals to half is preferably 200 µmol/L or less. "Superoxide anion radicals" may be represented by $O_2^-$., though they are called superoxide anions in some literatures. It should be noted that the "superoxide anion radicals" used herein includes "superoxide anions."

The molar ratio (R value) of the colloid-protecting agent to the platinum is preferably 80-180. The number of moles of the polyacrylic acid salt is calculated on a monomer basis. The polyacrylic acid salt is preferably sodium polyacrylate.

The method for producing a nanocolloidal platinum dispersion according to the present invention comprises the steps of refluxing a solution comprising a platinum salt, a polyacrylic acid salt, an alcohol and water, evaporating the alcohol and the water from the resultant dispersion to such an extent that part of them remain, adding alcohol to the dispersion, and then evaporating alcohol and water again.

The alcohol is preferably ethanol. The R value of the dispersion is preferably 80-180.

The nanocolloidal platinum-containing drink of the present invention comprises the nanocolloidal platinum dispersion of the present invention.

The content of the nanocolloidal platinum in the drink is preferably 0.0001-100 µmol/L. The nanocolloidal platinum-containing drink preferably contains a cation with an osmotic pressure of 250-350 mOsm·kg$^{-1}$. The cation is preferably at least one selected from the group consisting of a sodium ion, a potassium ion, a magnesium ion and a calcium ion.

EFFECT OF THE INVENTION

The nanocolloidal platinum dispersion of the present invention contains nanocolloidal platinum in a uniform particle size distribution, thereby exhibiting excellent ability to remove reactive oxygen species. Accordingly, when taken in a human body, it can efficiently remove reactive oxygen species.

The method of the present invention can stably produce a nanocolloidal platinum dispersion having a narrow particle size distribution. Because the nanocolloidal platinum dispersion contains substantially no large nanocolloidal platinum particles with their percentage only little changing, it stably has high ability to remove active oxygen species. The method of the present invention can produce a dispersion containing nanocolloidal platinum and sodium polyacrylate. Because both of platinum and sodium polyacrylate are confirmed to be safe as food additives, the nanocolloidal platinum dispersion containing sodium polyacrylate may be included in drinks.

The nanocolloidal platinum-containing drink of the present invention contains the nanocolloidal platinum dispersion of the present invention. The nanocolloidal platinum is absorbed in a human body while keeping high ability to remove reactive oxygen species, without being decomposed in digestive organs. Though the absorbed nanocolloidal platinum turns reactive oxygen species to an inactive form in a human body, it is not consumed by a decomposition reaction, thereby exhibiting a catalytic reactivity. Because the nanocolloidal platinum can remove reactive oxygen species in a human body for a long period of time, having the nanocolloidal platinum-containing drinks results in efficiently removing reactive oxygen species in a human body.

BEST MODE FOR CARRYING OUT THE INVENTION

[1] Nanocolloidal Platinum Dispersion

The nanocolloidal platinum dispersion of the present invention comprises nanocolloidal platinum and a polyacrylic acid salt. The "nanocolloidal platinum dispersion" used herein means a uniform dispersion of nanocolloidal platinum. The polyacrylic acid salt is coordinated to platinum, so that it functions as a colloid-protecting agent for improving the affinity of platinum for a solvent.

The polyacrylic acid salts are preferably sodium polyacrylate or potassium polyacrylate, particularly sodium polyacrylate. Because sodium polyacrylate is a food additive permitted under The Food Sanitation Act, the use of sodium polyacrylate as a colloid-protecting agent provides a nanocolloidal platinum dispersion, which is safe when added to drinks.

An R value in the nanocolloidal platinum dispersion is preferably 80-180, more preferably 90-170, particularly preferably 100-150. The R value means a molar ratio of a colloid-protecting agent to platinum. The number of moles of the polyacrylic acid salt is calculated on a monomer basis. When the R value is within 80-180, the nanocolloidal platinum can be kept dispersed even in isotonic ion solutions containing cations, etc. The term "isotonic" means a state having the same osmotic pressure as that of a body fluid. An isotonic solution specifically has an osmotic pressure of about 250-350 mOsm·kg$^{-1}$. A specific example of the isotonic solutions is a physiological saline solution (0.9-%-by-mass aqueous NaCl solution). When the nanocolloidal platinum dispersion is added to drinks, the drinks are preferably isotonic such that the nanocolloidal platinum is easily absorbed in a human body. Accordingly, if the nanocolloidal platinum had low dispersibility in an isotonic solution, it would be impossible to produce drinks, in which the nanocolloidal platinum is uniformly dispersed.

The average particle size of the nanocolloidal platinum is 1-5 nm, preferably 1-3 nm, particularly 1.5-2.5 nm. 90% or more of the nanocolloidal platinum preferably has a particle size within a range of 0.1-10 nm, more preferably 1-3 nm. Because of such a narrow particle size distribution and an average particle size in a range of 1-5 nm, it is considered that the nanocolloidal platinum exhibits high ability to remove reactive oxygen species when taken in a human body. The nanocolloidal platinum dispersion having such a narrow particle size distribution can be produced by a method described below.

The nanocolloidal platinum has high ability to remove reactive oxygen species such as superoxide anion radicals, hydroxyl radicals, hydrogen peroxide, etc. The concentration IC$_{50}$ of nanocolloidal platinum necessary for reducing reactive oxygen species to half is preferably 200 μmol/L or less, more preferably 180 μmol/L or less. The IC$_{50}$ is defined herein as the minimum concentration of the nanocolloidal platinum dispersion necessary for making a ratio of Cpt/Cw to 50%, wherein Cw represents the concentration of reactive oxygen species measured 45 seconds after water is added to an equal amount of an aqueous solution generating a predetermined concentration of reactive oxygen species, and Cpt represents the concentration of reactive oxygen species measured 45 seconds after the nanocolloidal platinum dispersion is mixed with an equal amount of the same aqueous solution generating reactive oxygen species. It is presumed that the generated reactive oxygen species are mainly superoxide anion radicals. However, because other reactive oxygen species (hydroxyl radicals, hydrogen peroxide, etc.) can be removed, the concentration of reactive oxygen species means the total concentration of all reactive oxygen species. Because the concentration of reactive oxygen species cannot directly be measured, it is determined from the measured amount of a captor of an reactive oxygen species.

Taking superoxide anion radicals, one of the reactive oxygen species, for example, the method of measuring IC$_{50}$ will be explained. The superoxide anion radicals can be generated by usual methods, such as an enzymatic reaction method using hypoxanthine (HXN) as a reaction substrate and xanthine oxidase (XOD) as an oxidizing enzyme, a chemical reaction method using reduced nicotinamide adenine dinucleotide phosphate (NADPH) as an electron donor and phenazine methosulfate (PMS) as an electron-transferring agent. When IC$_{50}$ determined in an HXN/XOD system differs from IC$_{50}$ determined in an NADPH/PMS system, at least one IC$_{50}$ is preferably 200 μmol/L or less, and both of them are more preferably 200 μmol/L or less.

The reactive oxygen species deactivated by the nanocolloidal platinum include superoxide anions ($O_2^-$), superoxide anion radicals ($O_2^-$.), hydrogen peroxide ($H_2O_2$), hydroxyl radicals (.HO), singlet oxygen ($^1O_2$), peroxide lipid radicals, peroxide alcohol radicals, nitrogen monoxide (NO), etc. without restriction. It is considered that the nanocolloidal platinum catalytically reduces reactive oxygen species to generate water as illustrated by the following formulae (1):

(1)

[2] Production Method of Nanocolloidal Platinum Dispersion (1) Preparation of Platinum Salt Solution A solution comprising a platinum acid or its salt (simply called platinum salt hereafter), a polyacrylic acid salt, an alcohol and water is first prepared. The platinum salt is preferably soluble in a mixed solvent of an alcohol and water. Such platinum salts may be, for instance, hexachloroplatinic acid, potassium hexachloroplatinate, etc. Among them, hexachloroplatinic acid is preferable.

The polyacrylic acid salt may be in the form of a sodium salt, a potassium salt, etc. Among them, sodium polyacrylate is preferable.

The alcohol is preferably methanol, ethanol, n-propyl alcohol, n-butyl alcohol, n-amyl alcohol, ethylene glycol, etc., particularly ethanol. The use of ethanol provides a nanocolloidal platinum dispersion, which is safe when taken in a human body.

An aqueous solution containing a platinum salt is prepared. The concentration of the platinum salt is preferably 2 mmol/L or less, more preferably 1-2 mmol/L. A colloid-protecting agent is dissolved in water in another vessel. The concentration of the colloid-protecting agent solution is preferably 0.01-0.5 mol/L.

The aqueous platinum salt solution is added to the colloid-protecting agent solution to form a solution of a platinum salt and a colloid-protecting agent. The R value in the solution of a platinum salt and a colloid-protecting agent is preferably 80-180, more preferably 90-170, particularly 100-150. When the R value is more than 180, the colloid-protecting agent is not easily dissolved in a mixed solvent of water and alcohol, failing to obtain a uniform solution. On the other hand, when the R value is less than 80, the nanocolloidal platinum is vulnerable to salting-out when cations, etc. are added to the colloidal dispersion to adjust its osmotic pressure to 250-350 $mOsm \cdot kg^{-1}$, so that it is easily precipitated because of low dispersibility.

After adding the aqueous platinum salt solution, the solution of a platinum salt and a colloid-protecting agent is stirred. The stirring time is preferably about 30-40 minutes. After stirring, an alcohol is added to the solution of a platinum salt and a colloid-protecting agent to form a reaction solution. A molar ratio of the alcohol to the platinum salt is preferably 10-20 in the reaction solution.

(2) Refluxing

The reaction solution is refluxed. The refluxing is preferably carried out in an inert gas atmosphere. During refluxing, the alcohol such as ethanol, etc. is oxidized to aldehyde while reducing a platinum ion to form nanocolloidal platinum.

Substantially all platinum ion is turned to nanocolloidal platinum after refluxing for 2-3 hours, though the refluxing time may change depending on the amount of the platinum salt in the reaction solution. The disappearance of the platinum ion and the formation of the nanocolloidal platinum can be confirmed by the measurement of ultraviolet to visible light absorption spectra of the reaction solution.

(3) Preparation of Alcohol Dispersion

Alcohol and water are evaporated by heating and/or evacuating the refluxed reaction dispersion, until the volume of the reaction dispersion becomes about 5-20% of the volume before heating and/or evacuation. For instance, an eggplant flask containing the reaction dispersion is soaked in a worm water bath at room temperature to 30° C. for 60-90 minutes, while evacuating the flask by a water aspirator. If the reaction dispersion is 50 mL before heating and/or evacuation, evacuation is preferably conducted for about 60 minutes by a water aspirator, so that the remaining dispersion becomes about 5 mL.

An alcohol such as ethanol is added to the dispersion concentrated by the evaporation of alcohol and water and then stirred, to obtain a dispersion of colloidal platinum in alcohol. The amount of alcohol added is preferably set such that a molar ratio of the alcohol to the platinum salt used as a starting material is about 20-40.

(4) Preparation of Nanocolloidal Platinum Dispersion

A paste-like nanocolloidal platinum is obtained by heating and/or evacuating a solution (dispersion) of colloidal platinum in alcohol to evaporate a solvent. A solvent is added to this nanocolloidal platinum and stirred, to prepare a uniform nanocolloidal platinum dispersion. The solvent may be water, a mixture of water and ethanol, etc. If all solvent were evaporated directly from the reaction dispersion without conducting the step of adding alcohol to the paste-like nanocolloidal platinum, the resultant residue would be extremely sticky because of high viscosity, failing to obtain a uniform nanocolloidal platinum dispersion. On the contrary, because the production method of the present invention has a step of adding alcohol for dilution and evaporating it again after the evaporation of water and alcohol, nanocolloidal platinum having excellent dispersibility can be obtained.

Using the same procedures as in the production method of the nanocolloidal platinum dispersion of the present invention, nanocolloidal dispersions of other precious metals than platinum can be produced. Producible nanocolloidal dispersions are, for instance, a nanocolloidal gold dispersion and a nanocolloidal platinum/gold dispersion. The nanocolloidal platinum/gold is nanocolloid consisting of platinum and gold. The nanocolloidal platinum/gold has a core-shell structure comprising (a) a platinum core and a gold shell, or (b) a platinum shell and a gold core. Because gold is also a permitted food additive like platinum, it may be taken safely. However, the nanocolloidal platinum has higher ability to remove active oxygen species than the nanocolloidal gold and the nanocolloidal platinum/gold.

Nanocolloidal precious metal dispersions containing other colloid-protecting agents than sodium polyacrylate may also be prepared. Usable colloid-protecting agents include methyl cellulose, cyclodextrin, polycyclodextrin and glutathione. Methyl cellulose is permitted under The Food Sanitation Act, and thus can be taken in a human body. Because dextrin and glutathione are components contained in usual food, they can be taken safely. Because these colloid-protecting agents are coordinated around platinum and/or gold to some extent, the affinity of platinum and/or gold for a solvent is improved. However, even if these protecting agents exist in the dispersion, the nanocolloid of precious metals would not be able to be sufficiently dispersed. Unless sodium polyacrylate is used, a nanocolloidal dispersion having excellent ability to remove active oxygen species cannot be obtained. Accordingly, the nanocolloidal platinum dispersion comprising nanocolloidal platinum and sodium polyacrylate is optimum for the removal of active oxygen.

[3] Nanocolloidal Platinum-Containing Drinks (1) Concentration of Platinum

The concentration of nanocolloidal platinum in the nanocolloidal platinum-containing drinks is preferably 0.001-100 µmol/L, more preferably 0.01-10 µmol/L. When the concentration of nanocolloidal platinum is less than 0.001 µmol/L, one should inefficiently have a large amount of a nanocolloidal platinum-containing drink to take a sufficient amount of nanocolloidal platinum. Even if the concentration exceeds 100µmol/L, a correspondingly improved antioxidant effect cannot be obtained, undesirable in terms of cost.

(2) Other Components than Nanocolloidal Platinum (a) Inorganic Electrolytes and Organic Acid Salts As sports drinks, the nanocolloidal platinum-containing drinks preferably contain inorganic electrolytes, organic acid salts, saccharides and vitamins. The addition of inorganic electrolytes provides drinks for supplementing cations and anions, which are lost by perspiration during sports. Usual inorganic electrolytes, for instance, salts of alkali metals or alkali earth metals with various inorganic acids, such as NaCl, KCl, $MgCl_2$, $MgSO_4$, $MgCO_3$, $CaCl_2$, $CaSO_4$, $Na_2SO_4$, $K_3PO_4$, $Ca_3[PO_4]_2$, $K_2HPO_4$, $KH_2PO_4$, $CaHPO_4$, etc., can be used. These salts may preferably be combined. From the aspect of cost and absorption efficiency, at least one selected from the group consisting of sodium salts, potassium salts, magnesium salts and calcium salts is preferably contained. To supplement anions such as a chlorine ion, a phosphoric acid ion, etc., proper inorganic acids are used.

The cations may be added in the form of organic acid salts. The organic acid salts may be, for instance, salts of citric acid, lactic acid, L-glutamic acid, succinic acid, aspartic acid, alginic acid, malic acid, or gluconic acid. Specific examples thereof include sodium citrate, calcium citrate, sodium lactate, calcium lactate, sodium succinate, disodium succinate, sodium L-glutamate, sodium aspartate, calcium aspartate, sodium alginate, sodium malate, calcium gluconate, etc.

The inorganic electrolyte and/or the organic acid salt may be added in amounts necessary for supplementing cations or anions, preferably to provide the drinks with desired osmotic pressure. Thought changeable in a wide range depending on the formulations of the nanocolloidal platinum-containing drinks, the amount of the cation added is preferably about 10-40 mEq, more preferably about 20-60 mEq, in 1000 mL of the nanocolloidal platinum-containing drink. The amount of the inorganic anion is preferably about 10-25 mEq.

The organic acids may be added in the form of organic acid salts or free acids. The free acids may be the same acids as in the above organic acid salts. The amount of the organic acid may be the same as in usual drinks, though it may be larger or smaller, if necessary. For instance, the organic acid may be added in an amount of 1.3-2.5 g per 1000 mL of the nanocolloidal platinum-containing drink.

(b) Sweeteners

Sweeteners added to the nanocolloidal platinum-containing drinks may be saccharides, or synthetic or natural sweeteners. The saccharides include monosaccharides such as glucose, fructose, etc.; disaccharides such as maltose, sucrose, etc.; polysaccharides such as dextrin, cyclodextrin, etc.; sugar alcohols such as xylitol, sorbitol, erythritol, etc. The sweeteners may be natural sweeteners such as thaumatin, stevia extracts (Rebaudioside A, etc.), glycyrrhizin, etc.; synthetic sweeteners such as saccharin, Aspartame, etc. The amount of the saccharides is preferably about 1-15 g, more preferably about 3-12 g per 100 mL of the nanocolloidal platinum-containing drink. The amount of the sweetener may change depending on its sweetness, but is preferably determined to provide substantially the same sweetness as when the saccharides are used.

(c) Other Components

The nanocolloidal platinum-containing drink of the present invention may contain fruit juices and amino acids. The fruit juices may be, for instance, grapefruit juice, apple juice, orange juice, lemon juice, pineapple juice, banana juice, pear juice, grape juice, etc. The amino acids may be, for instance, sodium glutamate, glycin, alanine, sodium aspartate, etc.

Usable are various other additives than described above, such as vitamins, minerals, synthetic or natural flavors, colorants, etc. tasting materials (cheese, chocolate, etc.), pectic acid and its salts, alginic acid and its salts, etc., thickeners, pH-adjusting agents, stabilizers, preservatives, glycerins, alcohols, foaming agents for carbonate drinks, etc. These materials may be used alone or in combination. These additives are usually added in a range of about 0-20 parts by weight per 100 parts by weight of the nanocolloidal platinum-containing drink.

Various vitamins may be used, regardless of whether they are water-soluble or lipophilic. Their examples include retinol palmitate, bisbentiamine, riboflavin, pyridoxine hydrochloride, cyanocobalamine, sodium ascorbate, cholecalciferol, nicotinamide, calcium pantothenate, folic acid, biotin, and choline bitartrate. Among them, vitamin E and/or vitamin C are preferably added. Vitamin E and/or vitamin C exhibit high ability to remove active oxygen species immediately after ingestion. It is thus expected that the drinks containing vitamin E and/or vitamin C exhibit improved ability to remove active oxygen species immediately after ingestion.

The minerals may be sodium chloride, sodium acetate, magnesium sulfate, magnesium chloride, calcium chloride, dipotassium hydrogen phosphate, monosodium phosphate, calcium glycerophosphorate, iron and sodium succinate citrate, manganese sulfate, copper sulfate, zinc sulfate, sodium iodide, potassium sorbate, zinc, manganese, copper, iodine, cobalt, etc. The amounts of these minerals may be properly determined depending on applications.

(3) Properties of Nanocolloidal Platinum-Containing Drinks

The osmotic pressure of the nanocolloidal platinum-containing drink is preferably 250-350 $mOsm \cdot kg^{-1}$, more preferably 280-320 $mOsm \cdot kg^{-1}$. With the osmotic pressure of 250-350 $mOsm \cdot kg^{-1}$, close to the osmotic pressure of a body fluid, the nanocolloidal platinum is easily absorbed in a human body. With the amounts of the above-described inorganic electrolyte and organic acid salt adjusted, the osmotic pressure of the drink can be controlled within a desired range.

The nanocolloidal platinum-containing drinks may be soft drinks, alcohol drinks (beer, Sake, wine, whiskey, etc.), dairy drinks (milk, fermented milk, lactobacillus drinks, etc. including yogurts in accordance with the classification by the Regulation 52 A of the Ministry of Health and Welfare). The soft drinks may be sports drinks, near water, tea (black tea, green tea, oolong tea, etc.), and fruit drinks such as natural juices, juice drinks, fruit pulp drinks, juice-containing drinks, drinks containing fruit pulp chips, etc. classified according to the Japanese Agricultural Standard.

The nanocolloidal platinum-containing drinks may be gel-like drinks. The gel-like drinks are slightly gelled drinks, which are contained in flexible bags, etc. having straw-like openings, through which the gelled drinks are sucked. Shaking, etc. at room temperature can easily break the gel structures of the gel-like drinks or separate water therefrom. The gel-like drink can be produced by dissolving materials for the above nanocolloidal platinum-containing drinks in water, adding a gelling agent to the drink, introducing the heated dispersion into a bag, and gelling it in the bag. The gelling agents may be agar, carrageenan, locust bean gum, xanthan gum, gellan gum, pectin, etc.

How much nanocolloidal platinum-containing drink should be taken depends on the age of a person having the drink, the purpose of having the drink, the concentration of nanocolloidal platinum, etc. When a usually active adult person takes about 1-100 mL/kg/day of the drink having a nanocolloidal platinum concentration of about 0.1 μmol/L, reactive oxygen species are extremely effectively removed from his or her body.

The present invention will be explained in further detail by Examples below, without intension of restricting the present invention thereto.

EXAMPLE 1

(1) Production of Nanocolloidal Platinum [Protecting Agent: Sodium Polyacrylate (PAA) having R Value of 100]

A reaction system was assembled from a 100-ml, two-necked eggplant flask, an allihn condenser, and a three-way cock. 0.31 g of sodium polyacrylate (available from Aldrich) and 23 mL of pure water (water purified by using Milli-Q, a water purification system available from Nihon Millipore, hereinafter referred to as "Milli-Q water") were charged into the two-necked eggplant flask and dissolved, and stirred for 10 minutes by a stirrer chip. A hexachloroplatinic acid crystal ($H_2PtCl_6·6H_2O$, available from Wako Pure Chemical Industries, Ltd.) was dissolved in distilled water to a concentration of $1.66 \times 10^{-2}$ mol/L. 2 mL of this aqueous solution of hexachloroplatinic acid was introduced into the two-necked eggplant flask, and further stirred for 30 minutes.

After the atmosphere in the reaction system was substituted by nitrogen, 25 mL of ethanol was added, and refluxed at 100° C. for 2 hours while keeping a nitrogen atmosphere. The reaction dispersion was subjected to ultraviolet/visible light absorption spectrum measurement after refluxing. It was thus found that the peaks of a platinum ion disappeared, and that the peaks of surface plasmon absorption peculiar to a solid metal appeared.

Using a rotary evaporator, the eggplant flask was kept at reduced pressure by a water aspirator for about 60 minutes while being soaked in a warm water bath at 30° C. When water and the alcohol were evaporated from the reaction dispersion until the reaction mixture in the flask became about 5 mL, evacuation was stopped, and 50 mL of ethanol was added. The flask containing the resultant alcohol dispersion was evacuated by a water aspirator to cause the solvent to be evaporated from the alcohol dispersion again, thereby obtaining a paste-like nanocolloidal platinum. 33 mL of Milli-Q water was added to the paste-like nanocolloidal platinum, to obtain a 1 mmol/L of a nanocolloidal platinum dispersion containing sodium polyacrylate as a protecting agent (aqueous PAA-Pt dispersion).

(2) Measurement of Antioxidant Ability (a) Hypoxanthine (HXN)/Xanthine Oxidase (XOD)

(i) Measurement of Amount of Active Oxygen Species Captor

Figure 1:
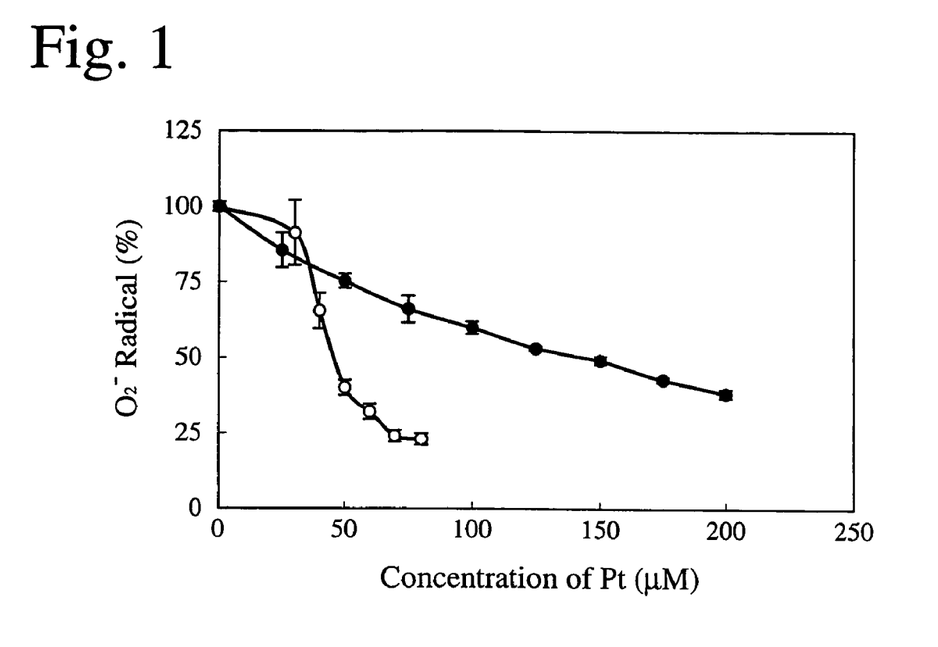
FIG. 1 is a graph showing the relation between the concentration of Pt and the percentage of remaining $O_2^-$.

Using HXN as a reaction substrate and XOD as an oxidizing enzyme, active oxygen species (simply expressed by $O_2^-$.) were generated by an enzymatic reaction, to cause a reaction with the aqueous PAA-Pt dispersion as described below. First, 1 mmol/L of the aqueous PAA-Pt dispersion prepared in the above step (1) was diluted by Milli-Q water to 25 μmol/L, 50 μmol/L, 75 μmol/L, 100 μmol/L, 125 μmol/L, 150 μmol/L, 175 μmol/L and 200 μmol/L, respectively, as shown in FIG. 1. Dissolved in 100 μL of each diluted dispersion were 50 μL of an aqueous HXN solution [5.5 mmol/L, containing 200 mmol/L of a phosphoric acid buffer (pH 7.5), HXN: available from Wako Pure Chemical Industries, Ltd.], and 15 μL, of 5,5-dimethyl-1-pyrroline-N-oxide (DMPO, available from Dojindo Laboratories). 50 μL, of an XOD solution [0.2 U/mL, containing 200 mmol/L of a phosphoric acid buffer (pH 7.5), XOD: available from Roche] was added to the resultant aqueous dispersion of HXN and PAA-Pt containing DMPO, to form an aqueous HXN-PAA-Pt-XOD dispersion containing DMPO. To prevent the deactivation of XOD, the XOD-containing solution was cooled in an ice bath.

DMPO was oxidized by $O_2^-$. generated by the enzymatic reaction of HXN and XOD to form DMPO-OOH ($O_2^-$. captor of DMPO). The amount of DMPO-OOH ($O_2^-$. captor of DMPO) in the aqueous HXN-PAA-Pt-XOD solution was measured using ESR after 45 seconds from the addition of the aqueous XOD solution. The measurement conditions of ESR were as follows:

Measuring equipment: JES-FA100,
Frequency: 9423 MHz (variable range: ±1 MHz),
Field center: 335.5 mT,
Field width: ±5.000 mT,
Power: 4.000000 mW,
Sweep time: 1.0 minute, and
Mn (marker): 700.

(ii) Calculation of Percentage of Remaining $O_2^-$.

The amount of the $O_2^-$. captor generated in the aqueous HXN-PAA-Pt-XOD solution was measured at each concentration of the Pt colloidal dispersion (PAA-Pt) used. The measurement results are shown by a percentage to a control in FIG. 5. The amount of the $O_2^-$. captor shown in FIG. 5 was determined by subtracting the following blank from the measured amount of the $O_2^-$. captor.

As a parameter showing the degree of the oxidation reaction of DMPO by HXN, the blank represents the amount of the $O_2^-$. captor measured in the same manner as in the step (i) except for adding DMPO to a mixture of HXN and Milli-Q water.

The amount of the $O_2^-$. captor was further measured in the same manner as in the step (i) except for adding XOD to the aqueous HXN-DMPO solution. The blank was subtracted from this measured amount to determine a control.

The amount of the $O_2^-$. captor (after subtracting the blank) at each colloidal platinum concentration was divided by the control to determine a percentage of the remaining $O_2^-$. The percentage of the remaining $O_2^-$. at each concentration of Pt is shown by a black circle in FIG. 1.

(b) Phenazine Methosulfate (PMS)/Reduced Nicotinamide Adenine dinucleotide phosphate (NADPH)

50 μL of aqueous solution of NADPH (available from Wako Pure Chemical Industries, Ltd.) [concentration: 13.3 mmol/L, containing 200 mmol/L of a phosphoric acid buffer (pH 7.5)] was used as an electron donor, and 50 μL of aqueous solution of PMS (available from Wako Pure Chemical Industries, Ltd.) [concentration: 17.6 μmol/L, containing 200 mmol/L of a phosphoric acid buffer (pH 7.5)] was used as an electron-transferring agent. 100 μL of the aqueous PAA-Pt dispersion at each concentration of Pt shown in FIG. 1 was mixed with an aqueous NADPH solution, and the resultant aqueous NADPH-PAA-Pt dispersion was mixed with DMPO and finally with an aqueous PMS solution in the same manner as in the above step (a). The amount of DMPO-OOH in the resultant aqueous NADPH-PAA-Pt-DMPO-PMS dispersion was measured using ESR after 45 seconds from the addition of the aqueous PMS solution. Because PMS is decomposable by light, a series of analyses was conducted in the dark.

Using as a control the amount of the $O_2^-$. captor when DMPO was added to an aqueous solution containing only the aqueous NADPH solution and Milli-Q water (Pt concentration: 0 μmol/L, the percentage of $O_2^-$. remaining in the aqueous solution was calculated from the percentage of the $O_2^-$. captor to the control at each Pt concentration. The percentage of the remaining $O_2^-$. at each concentration of Pt is shown by white circles in FIG. 1.

The $IC_{50}$ of PAA-Pt determined from FIG. 1 was 135.7±9.0 μmol/L in the HXN/XOD system, and 45.6 μmol/L in the NADPH/PMS system. The $IC_{50}$ of PAA-Pt in the HXN/XOD system is shown in Table 2.

In any system, the amount of $O_2^-$. captured decreased as the concentration of the aqueous PAA-Pt dispersion increased. It was confirmed that $O_2^-\cdot$ was generated by an oxidation reaction in the NADPH/PMS system. It is presumed that the generated $O_2^-\cdot$ was converted to inactive species (finally water and oxygen) by the colloidal platinum before reacting with DMPO. In the enzymatic reaction system of HXN/XOD, too, the nanocolloidal platinum presumably did not prevent the enzymatic reaction per se, but converted the generated $O_2^-\cdot$ to inactive species.

(d) Measurement of Change with Time of Ability to Remove Reactive Oxygen Species To evaluate the change with time of the ability of PAA-Pt to remove active oxygen species in the NADPH-PMS system, DMPO was added to the aqueous NADPH-PAA-Pt-PMS dispersion after 0 minutes, 5 minutes, 10 minutes, 15 minutes, 30 minutes, 45 minutes and 60 minutes, respectively, from the addition of PMS, and the amount of DMPO-OOH in the aqueous dispersion was measured using ESR after 45 seconds from the addition of DMPO. The other conditions than the above were the same as in the above step (b). The percentage of $O_2^-\cdot$ remaining in the aqueous dispersion was determined from the measured amount of an $O_2^-\cdot$ captor formed. The change with time of the percentage of the remaining $O_2^-\cdot$ after the addition of PMS in the preparation of the aqueous NADPH-PAA-Pt-PMS dispersion is shown by white circles in FIG. 2.

EXAMPLE 2

(3) Aqueous PAA-Pt Dispersion with Various R Values Ranging from 40 to 200

(a) Preparation of Aqueous PAA-Pt Dispersion

An aqueous PAA-Pt dispersion was prepared in the same manner as in the step (1) in Example 1 except for adding sodium polyacrylate (available from Wako Pure Chemical Industries, Ltd.) such that the R value became 40, 50, 75, 125, 150 and 200, respectively. This aqueous PAA-Pt dispersion was left to stand overnight to observe the dispersibility of PAA-Pt. The results are shown in Table 1.

(b) Preparation of Aqueous Sodium Chloride Dispersion Containing PAA-Pt

An aqueous sodium chloride dispersion containing PAA-Pt was prepared in the same manner as in the step (1) in Example 1, except for adding sodium polyacrylate (available from Wako Pure Chemical Industries, Ltd.) to have an R value of 40, 50, 75, 125, 150 and 200, respectively, to turn the aqueous PAA-Pt dispersion paste-like, and then adding an aqueous sodium chloride solution (0.9% by mass). This aqueous sodium chloride solution containing PAA-Pt was left to stand overnight, to evaluate the dispersibility by the standards below. The results are shown in Table 1.

Excellent: A uniform colloidal dispersion was obtained.
Poor: Colloid particles were precipitated.
Impossible: Sodium polyacrylate was not dissolved in ethanol, so that a colloid dispersion could not be prepared.

(4) Measurement of Average Particle Size and $IC_{50}$ of PAA-Pt (R value: 40-200)

Figure 3:
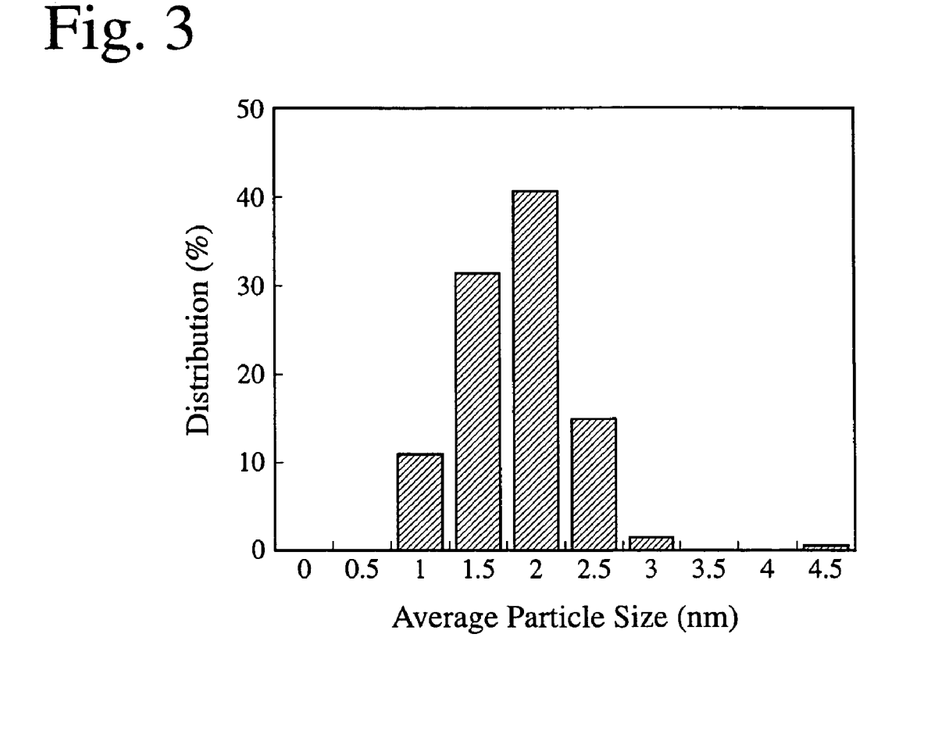
FIG. 3 is a graph showing a particle size distribution of nanocolloidal Pt particles in a PAA-Pt system.

The $IC_{50}$ of an HXN/XOD system in an aqueous PAA-Pt dispersion at each R value was determined in the same manner as in the step (2) in Example 1 except for using the aqueous PAA-Pt dispersion obtained in the above step (3). A TEM photograph of nanocolloidal particles in the aqueous PAA-Pt dispersion at each R value was taken, and 200 nanocolloidal Pt particles were arbitrarily selected in the photograph to determine the average particle size of the nanocolloidal Pt particles. The $IC_{50}$ of the aqueous PAA-Pt dispersion and the average particle size of the nanocolloidal Pt particles are shown in Table 1, and the particle size distribution of the nanocolloidal Pt particles is shown in FIG. 3.

TABLE 1

| R Value | Dispersibility of Aqueous Solution | | Average Particle Size of Pt Colloid ± S.D.[1] (nm) | $IC_{50}$ ± S.D.[1] (μmol/L) |
|---|---|---|---|---|
| | With NaCl | Without NaCl | | |
| 40 | Good | Poor | 2.35 ± 0.78 | 166.9 ± 10.4 |
| 50 | Good | Poor | 2.35 ± 0.70 | 162.0 ± 18.4 |
| 75 | Good | Poor | 2.19 ± 0.57 | 152.9 ± 14.1 |
| 100 | Good | Good | 1.93 ± 0.48 | 135.7 ± 9.0 |
| 120 | Good | Good | 2.02 ± 0.43 | 134.1 ± 12.0 |
| 150 | Good | Good | 1.91 ± 0.39 | 125.0 ± 9.4 |
| 200 | Impossible | Impossible | —[2] | —[2] |

Note:
[1] S.D. represents a standard deviation.
[2] Not measured.

Sodium polyacrylate was not dissolved in ethanol at an R value of 200, failing to prepare an aqueous PAA-Pt dispersion. When an aqueous sodium chloride dispersion containing PAA-Pt was prepared at R values of 40, 50 and 75, respectively, colloid particles were dispersed in the aqueous solution in an early stage of preparation, but the nanocolloidal particles were precipitated overnight. At the R values of 100, 125 and 150, the PAA-Pt colloidal particles were still uniformly dispersed in a 0.9-%-by-mass aqueous NaCl solution even after passing overnight.

COMPARATIVE EXAMPLE 1

Figure 5:
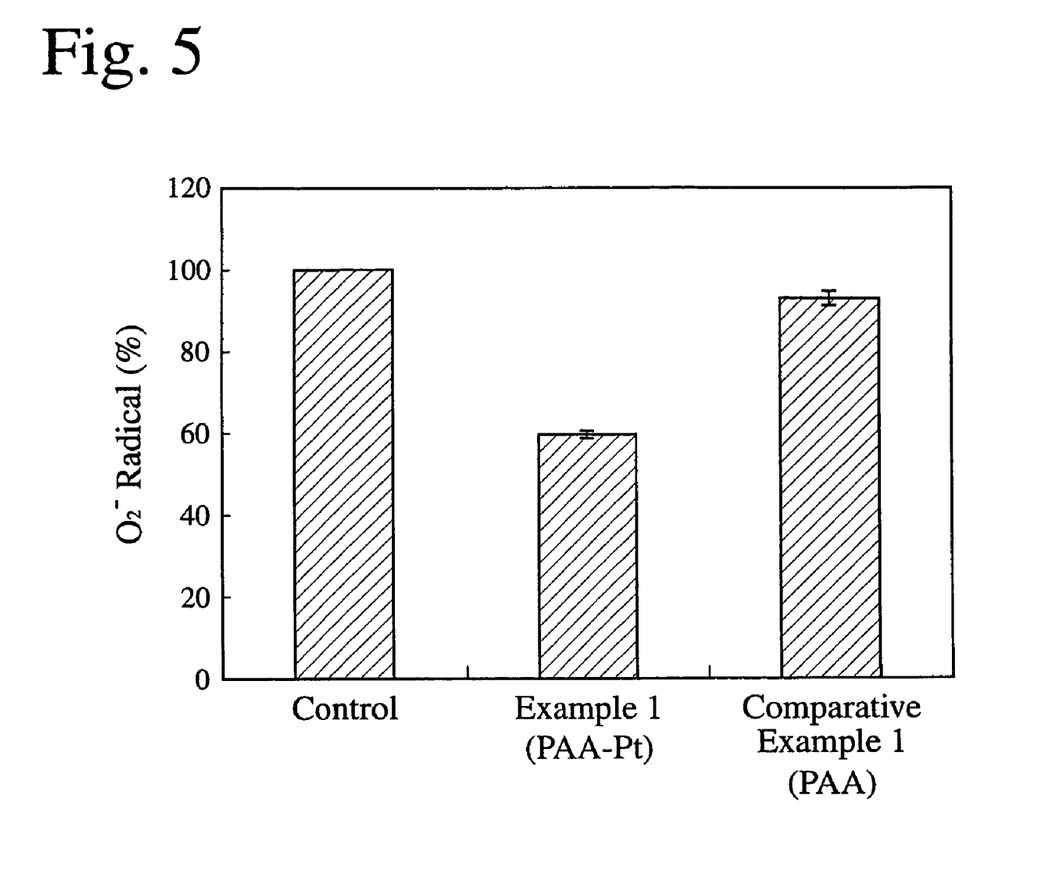
FIG. 5 is a graph showing the ability of the aqueous PAA-Pt dispersion and the PAA solution to remove $O_2^-$.

The amount of DMPO-OOH ($O_2^-\cdot$ captor of DMPO) was measured in the same manner as in Example 1 except for using an aqueous sodium polyacrylate solution containing no nanocolloidal platinum to determine the amount of $O_2^-\cdot$ remaining in the solution. The results are shown as a percentage to the control in FIG. 5. As in Example 1, the percentage of $O_2^-\cdot$ shown in FIG. 5 is obtained by subtracting the blank from the measured value. As shown in FIG. 5, the amount of $O_2^-\cdot$ in Comparative Example 1 was substantially the same the control. This indicates that $O_2^-\cdot$ generated in the HXN/XOD system was not removed when the aqueous sodium polyacrylate solution containing no nanocolloidal platinum was added.

COMPARATIVE EXAMPLE 2

The $IC_{50}$ of vitamin C was determined in the same manner as in the (2)(a) in Example 1, except for adding an aqueous solution of vitamin C (L-ascorbic acid, available from Wako Pure Chemical Industries, Ltd., 100 μmol/L) to an aqueous HXN/XOD solution generating $O_2^-\cdot$. The results are shown in Table 2.

An aqueous solution of NADPH, vitamin C and PMS was prepared in the same manner as in the step (2)(d) in Example 1, except for adding NADPH and PMS to an aqueous solution of vitamin C (L-ascorbic acid, 100 μmol/L and the amount of $O_2^-\cdot$ remaining in the solution was determined. The change with time of the percentage of the remaining $O_2^-\cdot$ from the addition of PMS in the preparation of the aqueous solution of NADPH, vitamin C and PMS is shown by black circles in FIG. 2.

COMPARATIVE EXAMPLE 3

The $IC_{50}$ of SOD was determined in the same manner as in the step (2)(a) in Example 1, except for adding an aqueous solution of SOD (antioxidant enzyme, WK-013 available from Wakamoto Pharmaceutical Co., Ltd.) to an aqueous HXN/XOD solution generating $O_2^-$. The results are shown in Table 2.

TABLE 2

| No. | Material for Removing Active Oxygen | $IC_{50}$ ± S.D.* (μmol/L) |
|---|---|---|
| Comparative Example 2 | Vitamin C | 27.5 ± 2.3 |
| Comparative Example 3 | SOD | $(1.1 ± 0.2) \times 10^{-4}$ |
| Example 1 | PAA-Pt | 135.7 ± 9.0 |

Note:
*"S.D." means a standard deviation.

Figure 2:
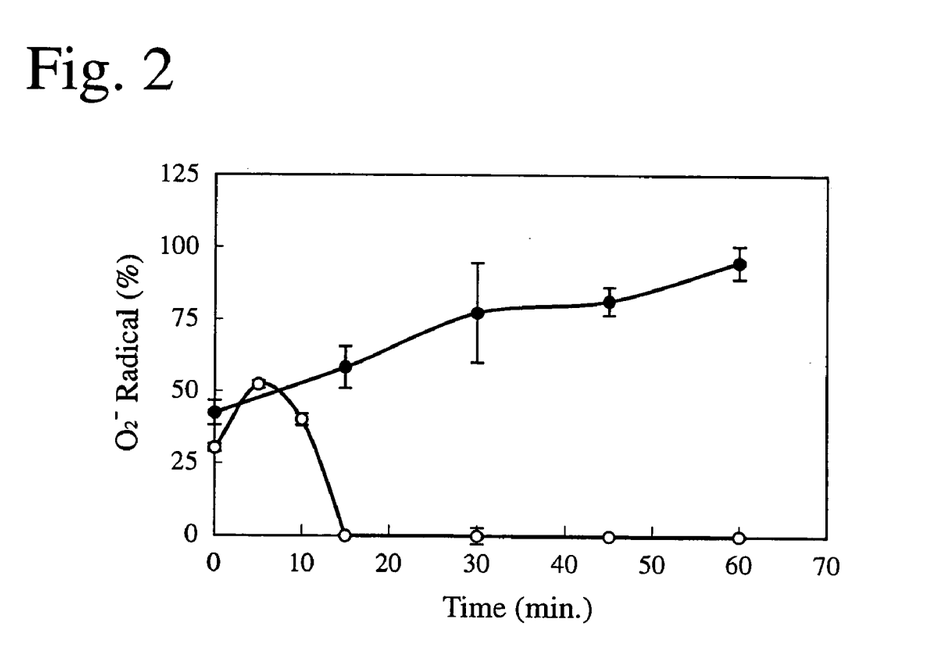
FIG. 2 is a graph showing the relation between the time period passing after the addition of PMS to an aqueous NADPH-PAA-Pt dispersion and the percentage of $O_2^-$. remaining in the aqueous dispersion.

Though vitamin C has excellent ability to remove reactive oxygen species as shown in Table 2, as is clear from FIG. 2, its ability to remove reactive oxygen species lasted for an extremely short period of time. This appears to be due to the fact that while the PAA-Pt in Example 1 catalytically deactivates the reactive oxygen species, vitamin C is consumed in a reaction deactivating the reactive oxygen species.

Though SOD also has excellent ability to remove reactive oxygen species as shown in Table 2, an orally administered SOD, which is an enzyme, is immediately decomposed by digestive enzymes such as pepsin, etc. in the mouth and the stomach. Because SOD cannot be absorbed in a human body while keeping its activity, it fails to effectively remove reactive oxygen species in a human body.

REFERENCE EXAMPLE 1

A nanocolloidal platinum dispersion with polyvinylpyrrolidone (PVP) as a protecting agent (aqueous PVP-Pt dispersion, R value: 40) was prepared in the same manner as in the step (1) in Example 1 except for using 0.1467 g of PVP as a protecting agent. The $IC_{50}$ of PVP-Pt was then measured in the same manner as in the steps (2)(a) and (c) in Example 1 except for adding the aqueous PVP-Pt dispersion to aqueous HXN/XOD solution generating $O_2^-$. As a result, the $IC_{50}$ was 148.7±23.2 μmol/L.

The amount of $O_2^-$ captor was measured to determine the amount of $O_2^-$ remaining in the dispersion in the same manner as in the step (2)(d) in Example 1, except for using this aqueous PVP-Pt dispersion, and adding DMPO after 0 minutes, 5 minutes, 10 minutes, 15 minutes, 60 minutes and 75 minutes from the addition of the PMS solution. The change with time of the percentage of the remaining $O_2^-$ from the addition of PMS in the preparation of the aqueous NADPH-PVP-Pt-PMS dispersion is shown in FIG. 4.

Figure 4:
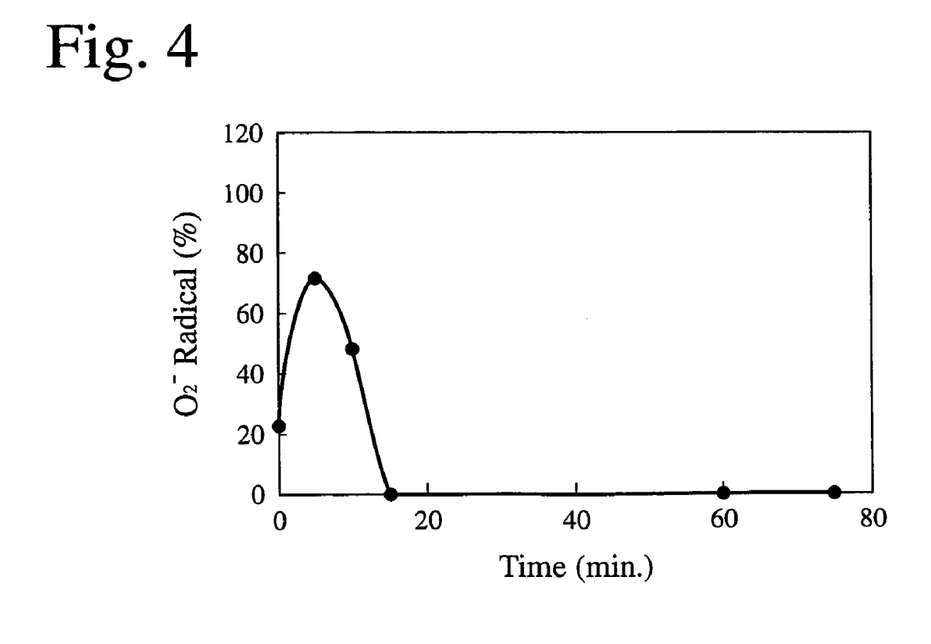
FIG. 4 is a graph showing the relation between the time period passing after the addition of PMS to an aqueous NADPH-PVP-Pt dispersion and the percentage of $O_2^-$. remaining in the aqueous dispersion.

It is clear from FIG. 4 that even with PVP as a protecting agent, the 15 colloidal platinum exhibits a function of catalytically removing reactive oxygen species for a long period of time.

The ability to remove reactive oxygen species is generally correlated with an oxidation-reduction potential; the lower the oxidation-reduction potential, the larger the ability to remove reactive oxygen species. To prove this, an aqueous PAA-Pt dispersion (Example 1) at a concentration of 1 mmol/L and an aqueous PVP-Pt dispersion (Reference Example 2) at a concentration of 1 mmol/L were prepared using Milli-Q water to measure the oxidation-reduction potential. The results are shown in Table 3. For comparison, the measured oxidation-reduction potentials of Milli-Q water and tap water are also shown in Table 3.

COMPARATIVE EXAMPLE 4

Measurement revealed that "Hakkin-Gensui" (tradename of The Lead Cooperation And Association) commercially available as a platinum-containing water had a Pt concentration of 2.5 mmol/L. The $IC_{50}$ of "Hakkin-Gensui" was measured in the same manner as in the step (2)(a) in Example 1, except for adding "Hakkin-Gensui" at various concentrations to an aqueous HXN/XOD solution generating $O_2^-$. As a result, the $IC_{50}$ was 251.4±7.4 μmol/L. Also, the oxidation-reduction potential of "Hakkin-Gensui" was 470 ±2.3 mV. The results are shown in Table 3.

COMPARATIVE EXAMPLE 5

"Hakkin-Gensui" diluted with Milli-Q water to a platinum concentration of 1 mmol/L was measured with respect to oxidation-deduction potential. The results are shown in Table 3

TABLE 3

| No. | Sample (Platinum Concentration) | $IC_{50}$ ± S.D.* (μmol/L) | Oxidation-Reduction Potential ± Standard Deviation (mV) |
|---|---|---|---|
| Comparative Example 4 | "Hakkin-Gensui" (2.5 mmol/L) | 251.4 ± 7.4 | 470 ± 2.3 |
| Comparative Example 5 | Diluted "Hakkin-Gensui" (1 mmol/L) | — | 496 ± 1.8 |
| Example 1 | Aqueous PAA-Pt Solution (1 mmol/L) | 135.7 ± 9.0 | 320 ± 1.7 |
| Reference Example 1 | Aqueous PVP-Pt Solution (1 mmol/L) | 148.7 ± 23.2 | 629 ± 0.9 |
| — | Milli-Q water | — | 480 ± 9.6 |
| — | Tap Water | — | 662 ± 12.1 |

Note:
*"S.D." represents a standard deviation.

As is clear from Table 3, "Hakkin-Gensui" (platinum concentration: 2.5 mmol/L) of Comparative Example 4 and diluted "Hakkin-Gensui" of Comparative Example 5 (platinum concentration: 1 mmol/L) had oxidation-reduction potential comparable to that of Milli-Q water and large $IC_{50}$, but the aqueous PAA-Pt dispersion (platinum concentration: 1 mmol/L) of Example 1 had extremely lower oxidation-reduction potential than that of Milli-Q water, and small $IC_{50}$.

However, Reference Example 1 indicates that all having low oxidation-reduction potential do not necessarily have large ability to remove active oxygen species. Namely, the PVP-Pt of Reference Example 1 has as small $IC_{50}$ as 148.7 ±23.2 μmol/L despite as high oxidation-reduction potential as 629±0.9 mV, while "Hakkin-Gensui" of Comparative Example 4 has as large $IC_{50}$ as 251.4±7.4 μmol/L despite its oxidation-reduction potential of 470±2.3 mV lower than that of the PVP-Pt of Reference Example 1.

REFERENCE EXAMPLE 2

The influence of a protecting agent on the oxidation-reduction potential of the nanocolloidal platinum was examined as follows. Sodium polyacrylate (PAA), a protecting agent for PAA-Pt, polyvinylpyrrolidone (PVP), a protecting agent for PVP-Pt, and Polysorbate 80, a protecting agent for "Hakkin-Gensui" were measured with respect to oxidation-reduction potential. The results are shown in Table 4.

TABLE 4

| Protecting Agent | Oxidation-Reduction Potential ± Standard Deviation (mV) |
| --- | --- |
| PAA | 238 ± 2.1 |
| PVP | 348 ± 1.2 |
| polysolvate 80 | 280 ± 1.3 |

The protecting agents exhibited the same tendency in oxidation-reduction potential as the nanocolloidal platinum, though smaller differences than in PAA-Pt, PVP-Pt and Polysorbate 80-Pt ("Hakkin-Gensui"). Namely, while the oxidation-reduction potentials of various platinum nanocolloids were in the order of PAA-Pt<"Hakkin-Gensui"<PVP-Pt, those of the protecting agents were the order of PAA<Polysorbate 80<PVP. It is thus considered that the oxidation-reduction potential of the nanocolloidal platinum depends on the protecting agent.

What is claimed is:

1. A nanocolloidal platinum dispersion comprising nanocolloidal platinum and a polyacrylic acid salt as a colloid-protecting agent, wherein said nanocolloidal platinum is capable of removing reactive oxygen species and has an average particle size of 1-3 nm, 90% or more of said nanocolloidal platinum having a particle size in a range of 0.1-10 nm, wherein a molar ratio (R value) of said colloid-protecting agent on a monomer basis to said nanocolloidal platinum is 100-150.

2. The nanocolloidal platinum dispersion according to claim 1, wherein the concentration $IC_{50}$ of nanocolloidal platinum necessary for reducing the concentration of said reactive oxygen species to half is 200 μmol/L or less.

3. The nanocolloidal platinum dispersion according to claim 1, wherein said polyacrylic acid salt is sodium polyacrylate.

4. The nanocolloidal platinum dispersion according to claim 1, wherein said reactive oxygen species include superoxide anions ($O_2^-$), superoxide anion radicals ($O_2^-$.), hydrogen peroxide ($H_2O_2$), hydroxyl radicals (.HO), singlet oxygen ($^1O_2$), peroxide lipid radicals, peroxide alcohol radicals, and nitrogen monoxide (NO).

5. The nanocolloidal platinum dispersion according to claim 4, wherein said superoxide anion radicals are generated by an enzymatic reaction method using hypoxanthine (HXN) as a reaction substrate and xanthine oxidase (XOD) as an oxidizing enzyme.

6. The nanocolloidal platinum dispersion according to claim 4, wherein said superoxide anion radicals are generated by a chemical reaction method using reduced nicotinamide adenine dinucleotide phosphate (NADPH) as an electron donor and phenazine methosulfate (PMS) as an electron-transferring agent.

7. A nanocolloidal platinum-containing drink comprising a nanocolloidal platinum dispersion, which comprises nanocolloidal platinum and a polyacrylic acid salt as a colloid-protecting agent, wherein said nanocolloidal platinum is capable of removing reactive oxygen species and has an average particle size of 1-3 nm, 90% or more of said nanocolloidal platinum having a particle size in a range of 0.1-10 nm, wherein a molar ratio (R value) of said colloid-protecting agent on a monomer basis to said nanocolloidal platinum is 100-150.

8. The nanocolloidal platinum-containing drink according to claim 7, wherein the content of said nanocolloidal platinum is 0.001-100 μmol/L.

9. The nanocolloidal platinum-containing drink according to claim 7, wherein it contains a cation, and has an osmotic pressure of 250-350 mOsm·kg$^{-1}$.

10. The nanocolloidal platinum-containing drink according to claim 9, wherein said cation is at least one selected from the group consisting of a sodium ion, a potassium ion, a magnesium ion and a calcium ion.

* * * * *